United States Patent Office 2,715,589
Patented Aug. 16, 1955

2,715,589

METALLIC IMPREGNATION OF POROUS METAL

Guy Benjamin Smith, Kent, Ohio, assignor to Ferro Powdered Metals, Inc., a corporation of Ohio No Drawing. Application October 26, 1951,
Serial No. 253,477

1 Claim. (Cl. 117—131)

This invention relates to the impregnation of porous metal parts with another metal of lower melting point than that of the porous metal part.

Typically, the metal of the part to be impregnated may be ferrous and the impregnating metal may be copper.

It is known in the art that at the necessary temperature for melting of copper, a slight amount thereof will alloy with iron, and that such dissolving action between the two metals will result in pitting and channeling at the surface of the finished impregnated article, impairing its appearance and in extreme instances its strength, sufficiently to be unacceptable.

It is also known in the art to avoid these objections by metallurgical methods such as that disclosed in Patent No. 2,401,221, issued May 28, 1946, to Bourne.

The principal objects of the present invention are to avoid the same objections, but this invention accomplishes the same by mechanical rather than metallurgical methods and means, and such may be considered a further object of the invention.

Further objects of the invention will be apparent from the following disclosure thereof, wherein reference is made to ferrous and non-ferrous metal, such as iron and copper, as having substantially different melting points, and by way of example but not limitation.

The part to be impregnated, then, is of ferrous metal, compacted but porous.

According to this invention for each porous metal part to be impregnated there is made another part, composed of a mixture of the impregnant metal and an inert or refractory material, such as carbon, graphite, silicon etc., of powders compacted under pressure into a briquette.

Such briquetted part is formed with a face adapted for contacting relation throughout a substantial area with a face of the porous metal part.

The proportions of impregnant metal and inert material in the briquetted part are such that sufficient impregnant metal is included, to produce the desired amount of impregnation of the porous metal part, and the volume of the briquetted part which will vary according to the mixture, is sufficient to the same end. By such control the impregnation to be had may be either complete or less as predetermined.

Such briquetted part is then disposed relative to the porous metal part, that the two cooperative faces thereof are in contacting relation; thus the briquetted part may be simply so placed on top of the porous metal part to be supported thereby.

Next, the temperature of the pair of parts so disposed is raised, as in a suitable furnace, beyond the melting point of the impregnant metal. The latter, thus liquefied, migrates into the porous metal part, by way of the contacting faces of the parts. The inert material of the briquetted part remains solid as a fluffy sponge blanketing the face of the now impregnated part.

None of the inert material enters with the impregnant and the inert material probably throttles the rate of impregnation. At any rate, the arrangement results in a perfect surface, free from pits and channels in the finished article, which latter also has greater tensile strength and elongation than heretofore.

Conveniently and therefore preferably, the operations just described are conducted during the sintering of the porous metal. Thus, the impregnation and sintering for practical purposes are simultaneous, and at least impregnation is completed by the time or before the sintering is completed.

Since sintering is a function of time and temperature, after the copper has migrated into the porous metal part, there will be some alloying between the two metals with consequent increase in strength of the resultant part, as well as the previously described improvement of the latter at the surface thereof, through which migration has taken place.

Such alloying in practice is probably more or less concentrated at such surface with a resultant advantage thereat unattainable by such metallurgical methods as referred to hereinabove.

As to the inert material of the briquetted part, the use of carbon is highly satisfactory since no chemical or physical change whatever takes place therein through the practice of the method, and 100% may be recovered after the sintering, and reused without any processing for reuse.

I claim:

The method of impregnating a porous metal part with another metal alloyable therewith and of lower melting point comprising: briquetting the impregnant metal with non-metallic solid material inert as to both said metals beyond said melting point to provide a briquetted part having a face adapted for contact with a face portion of said porous metal part, disposing the resultant briquetted part upon said porous metal part to be supported thereby in face to face contacting relation thereto, raising the temperature of the parts sufficiently to cause said impregnant metal to migrate as a liquid from the briquetted part into the porous metal part by way of said faces while maintaining the support of said inert material by said contacting relation, and removing the residual inert material from the resultant impregnated part.

References Cited in the file of this patent

UNITED STATES PATENTS

| Number | Name | Date |
|---|---|---|
| 1,735,000 | Dely | Nov. 12, 1929 |
| 2,193,435 | Smith | Mar. 12, 1940 |
| 2,219,005 | Daeves et al. | Oct. 22, 1940 |
| 2,401,221 | Bourne | May 28, 1946 |
| 2,422,439 | Schwarzkopf | June 17, 1947 |